United States Patent
Ruayana et al.

(10) Patent No.: US 12,512,655 B2
(45) Date of Patent: Dec. 30, 2025

(54) CABLE RETAINER AND METHOD

(71) Applicant: Lear Corporation, Southfield, MI (US)

(72) Inventors: Jun Roz Ruayana, Novi, MI (US); Muhammad Ashrafi, Woodhaven, MI (US); Vinodh Krishnan Balasubramanian, Sterling Heights, MI (US); Clint Rey Guevarra, Southfield, MI (US); John Montgomery, Canton, MI (US); William Bond, Livonia, MI (US); Erwin Baga-an, Cebu (PH)

(73) Assignee: Lear Corporation, Southfield, MI (US)

( * ) Notice: Subject to any disclaimer, the term of this patent is extended or adjusted under 35 U.S.C. 154(b) by 198 days.

(21) Appl. No.: 18/403,285

(22) Filed: Jan. 3, 2024

(65) Prior Publication Data

US 2025/0219376 A1 Jul. 3, 2025

(51) Int. Cl.
*H02G 3/32* (2006.01)

(52) U.S. Cl.
CPC ..................... *H02G 3/32* (2013.01)

(58) Field of Classification Search
CPC ....................................... H05K 3/387
USPC ........................................ 174/135
See application file for complete search history.

(56) References Cited

U.S. PATENT DOCUMENTS

| | | | |
|---|---|---|---|
| 4,918,261 A | 4/1990 | Takahashi | |
| 6,561,465 B2 * | 5/2003 | Kondo | F16L 3/1025 248/74.1 |
| 7,301,101 B2 | 11/2007 | Suzuki | |
| 7,507,906 B2 * | 3/2009 | Suzuki | H02G 3/32 174/72 A |
| 8,822,826 B2 * | 9/2014 | Onodi | H01R 12/67 174/117 FF |
| 2023/0369839 A1 | 11/2023 | Ruayana | |
| 2023/0369840 A1 | 11/2023 | Racho | |

FOREIGN PATENT DOCUMENTS

| | | | |
|---|---|---|---|
| JP | 2004104964 | * | 9/2002 |
| JP | 2004104964 A | | 4/2004 |

* cited by examiner

*Primary Examiner* — Stanley Tso
(74) *Attorney, Agent, or Firm* — Fishman Stewart PLLC (57) ABSTRACT

A cable retainer for connecting a flat cable, a first object, and/or a second object to one another may include a base, a retention member, and a channel. The base may include a platform, a fastener extending from the platform, a plurality of walls extending from the platform, and a plurality of wall openings disposed in the plurality of walls. The fastener may be engageable with said second object. The plurality of walls may be disposable through a portion of said flat cable. The plurality of wall openings may be aligned with one another and may at least partially define a common passage in which a connector is received to connect said first object to the base. The retention member may be adjustably connected to a first wall of the plurality of walls and may be adjustable to an open position and to a closed position.

20 Claims, 11 Drawing Sheets

CABLE RETAINER AND METHOD

TECHNICAL FIELD

The present disclosure generally relates to cable retainers for connecting one or more objects together, such as cable retainers that may, for example, be utilized in connection with and/or incorporated into vehicles.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
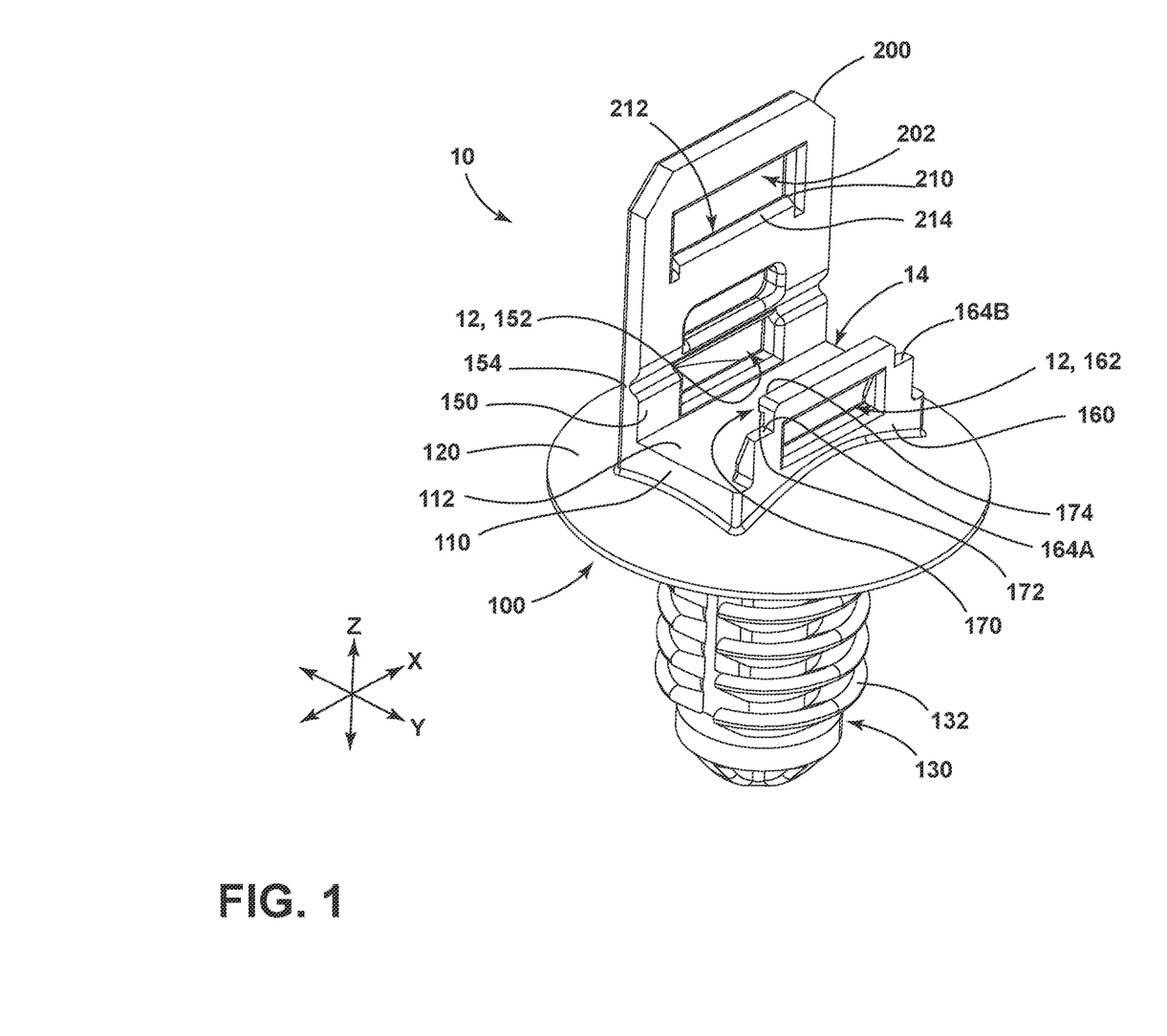
FIGS. 1 and 2 are perspective views generally illustrating an embodiment of a cable retainer with a retention member in an open position according to teachings of the present disclosure.
Figure 2:
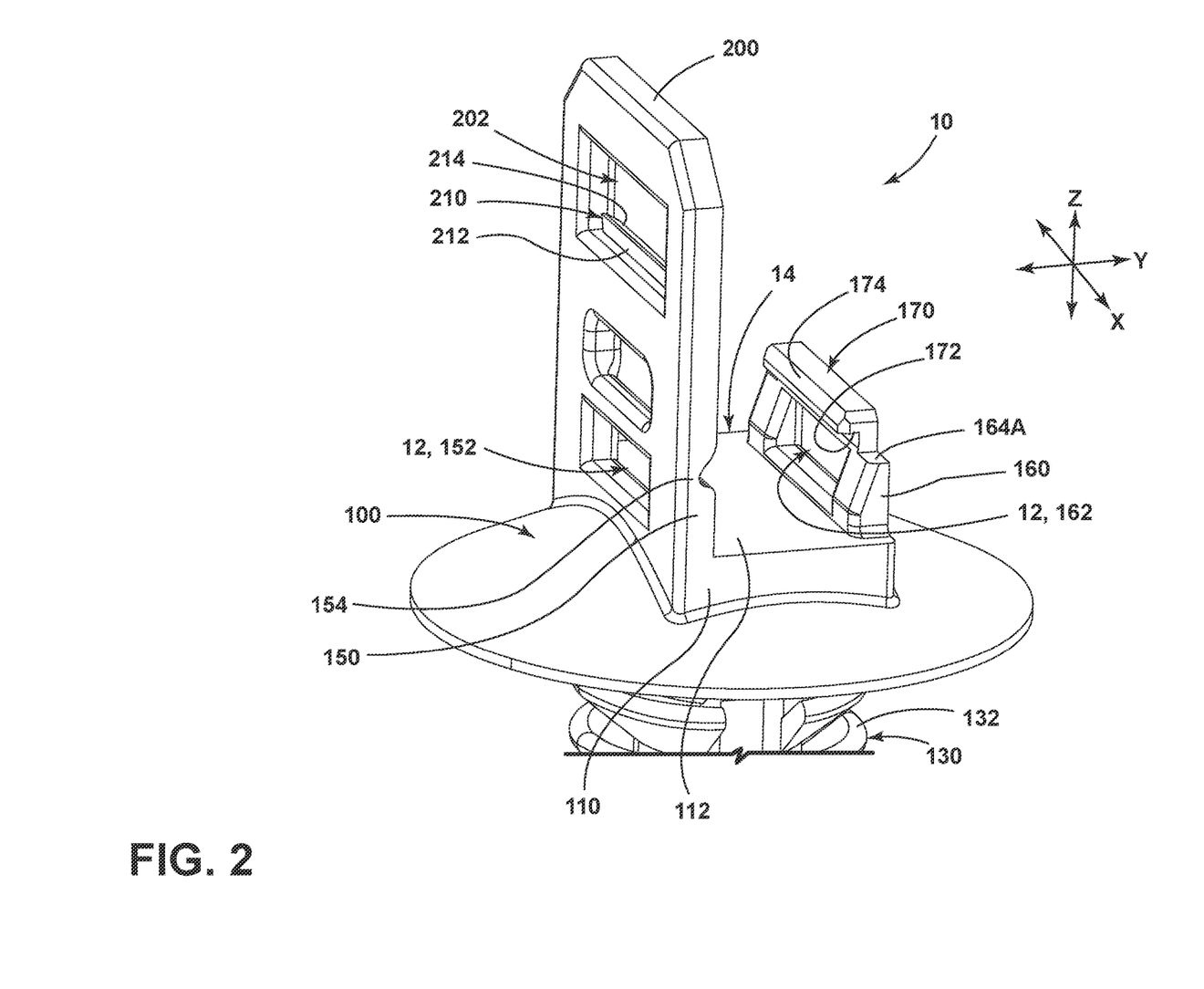
Figure 3:
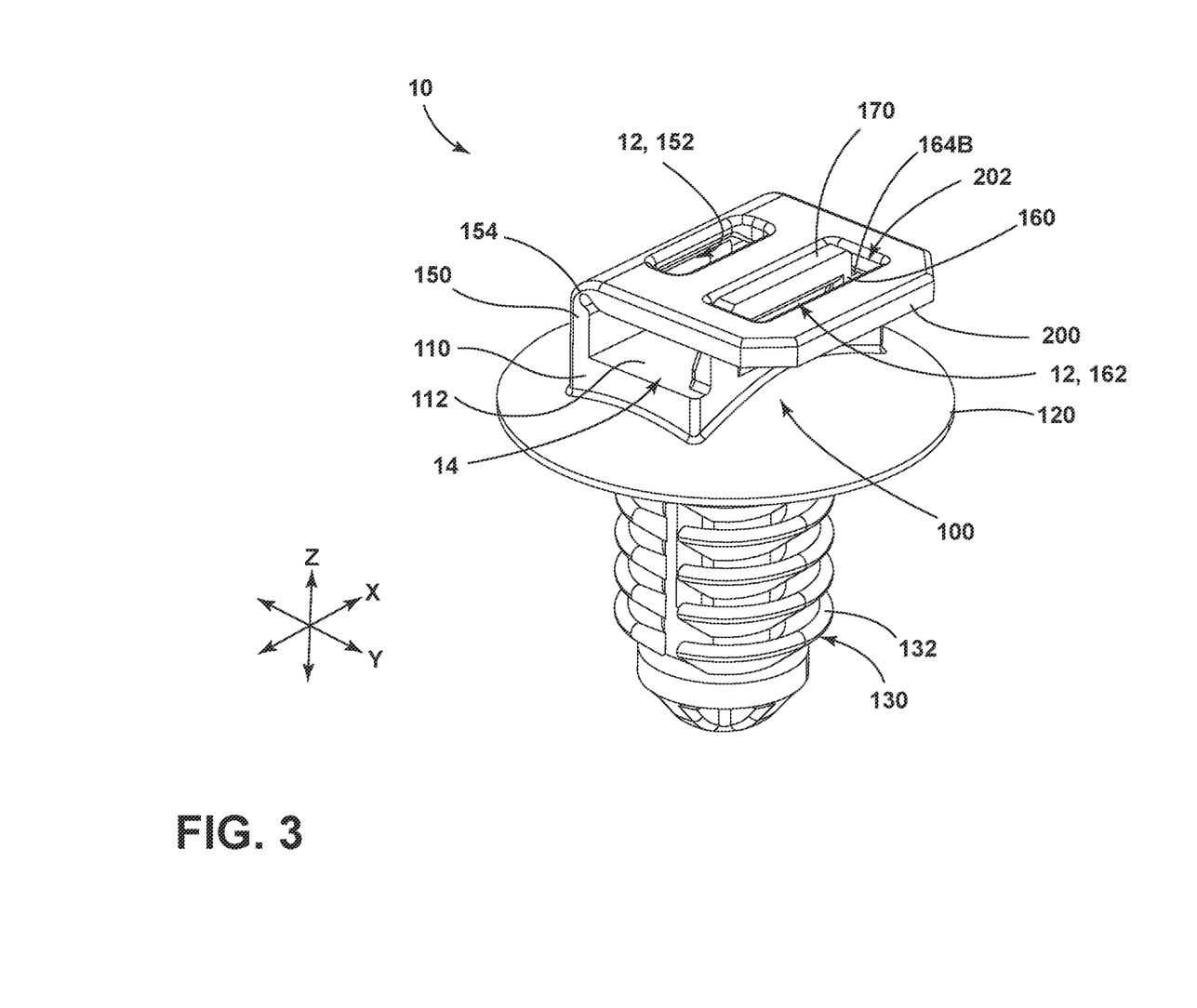
FIG. 3 is a perspective view generally illustrating an embodiment of a cable retainer with a retention member in a closed position according to teachings of the present disclosure.
Figure 4:
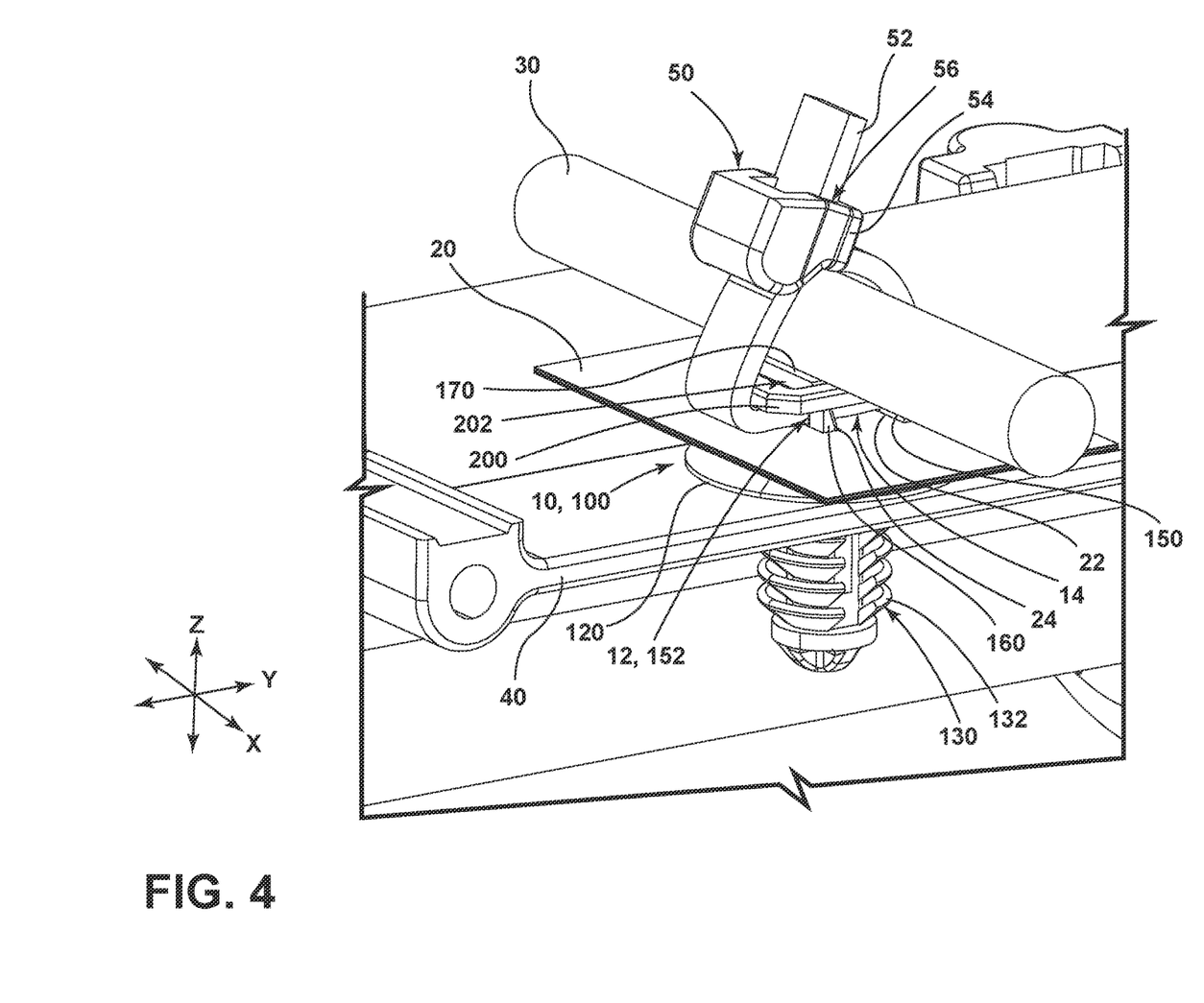
FIGS. 4 and 5 are perspective views generally illustrating an embodiment of a cable retainer connected to a flat cable, a first object, and a second object according to teachings of the present disclosure.
Figure 5:
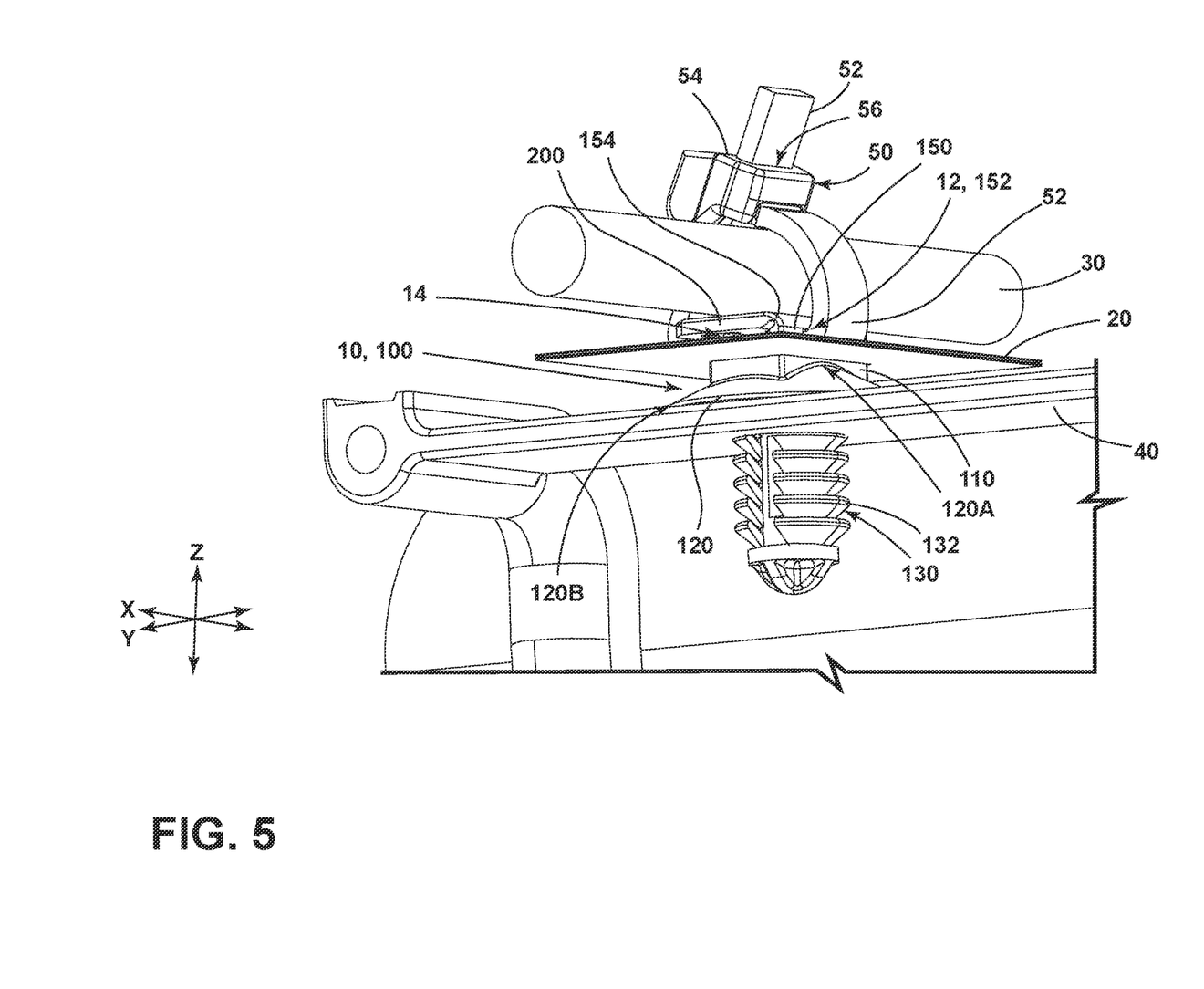

Referring to FIGS. 1-3, a cable retainer 10 for connecting a plurality of objects to one another is depicted. As generally illustrated in FIGS. 4-7E, the cable retainer 10 may be used to connect a flat cable 20 (e.g., a flat flexible cable), a first object 30 (e.g., a wire and/or a round wire bundle), and/or a second object 40 (e.g., a bracket, a mount, a panel, a surface, an external object, and/or another element or component of a vehicle) to one another. For example and without limitation, the cable retainer 10 may be used to connect and/or mount a flat cable 20 and/or a first object 30 to a second object 40.

The cable retainer 10 includes a base 100, a retention member 200, and a channel 14 that receives at least a portion of the flat cable 20. The channel 14 is disposed between and at least partially defined by the base 100 and/or the retention member 200. The base 100 and the retention member 200 are integrally formed as a single, unitary, monolithic component. In other embodiments, the base 100 and the retention member 200 are formed separately (e.g., as independent components) from one another and may or may not be connected to one another (e.g., via an independent hinge connector, a flexible strap, a tether). The cable retainer 10, the base 100, and the retention member 200 are composed of one or more plastic materials. However, the cable retainer 10, the base 100, the retention member 200, and/or one or more portions thereof are composed of other suitable materials, such as a metal and/or a metal alloy, in other embodiments.

The base 100 and the retention member 200 are adjustable relative to one another and are at least partially (e.g., adjustably and/or releasably) connected to one another to, for example, selectively open and/or close at least a portion of the channel 14 (e.g., an openable/closable end of the channel 14 disposed opposite the platform 110) and, thereby, releasably attach, connect, and/or secure the cable retainer 10 and the flat cable 20 to one another. The base 100 and/or the retention member 200 can be adjusted relative to one another to dispose the retention member 200 in an open position (see, e.g., FIGS. 1, 2, 7A, and 7B) and in a closed position (see, e.g., FIGS. 3-6 and 7C-7E), among others. When the retention member 200 is in an open position, the channel 14 is defined by the base 100 (e.g., the walls 150, 160 and the platform 110) and an openable/closable end of the channel 14 is open (e.g., is uncovered by the retention member 200). When the retention member 200 is in a closed position, the openable/closable end of the channel 14 is at least partially closed and/or covered by the retention member 200 such that the channel 14 is defined by and between the base 100 (e.g., the walls 150, 160 and the platform 110) and the retention member 200. The cable retainer 10 is connectable to the flat cable 20 when the retention member 200 is in an open position, but may not be connectable to and/or disconnected from the flat cable 20 when the retention member 200 is in a closed position. The cable retainer 10 is connectable to the first object 30 and/or to the second object 40 when the retention member 200 is in an open position and when the retention member 200 is in a closed position.

As generally illustrated in FIGS. 1-3, the base 100 includes a platform 110, a flange 120, a fastener 130, and a plurality of walls (e.g., a first wall 150 and a second wall 160). The base 100 is connectable to the retention member 200, the flat cable 20, and the first object 30 via one or more of the walls 150, 160. The base 100 is also connectable to the second object 40 via the fastener 130.

As generally illustrated in FIGS. 1-6, the flange 120 has a hollow, conical configuration. The platform 110 is disposed at and extends from a first, narrower end 120A of the flange 120 generally in the Z-direction (see, e.g., FIG. 6). In other embodiments, the platform 110 does not extend from the flange 120 and/or is defined by a portion of the flange 120. The platform 110 has a support surface 112 that faces away from the flange 120 (e.g., generally in the Z-direction) and supports at least a portion of the flat cable 20 when the flat cable 20 is connected to the cable retainer 10. The walls 150, 160 extend from the platform 110 (e.g., the support surface 112) and/or the flange 120 generally in the Z-direction (e.g., a first direction). The walls 150, 160 are disposed spaced apart from one another generally in the Y-direction (e.g., a second direction). The walls 150, 160 are generally disposed at opposite ends of the platform 110 and/or the support surface 112 relative to the Y-direction. The support surface 112 extends between and connects the walls 150, 160 transversely (e.g., obliquely or perpendicularly) to the Z-direction. The channel 14 is defined at least partially by and between the walls 150, 160 and/or the support surface 112. The channel 14 is also at least partially defined by the retention member 200 when the cable retainer is in the closed configuration. The fastener 130 is disposed on an opposite side of the platform 110 and/or the flange 120 relative to the walls 150, 160 and extends therefrom generally in a direction away from the walls 150, 160 (e.g., generally in the Z-direction). The fastener 130 is at least partially encircled by the flange 120 (e.g., the flange 120 extends around the fastener 130) and projects from a second, wider end 120B of the flange 120 (see, e.g., FIG. 6). In other embodiments, one or more of the walls 150, 160 and the fastener 130 extend in the same direction, extend obliquely relative to one another, or extend perpendicularly relative to one another.

As generally illustrated in FIGS. 1 and 3-6, the fastener 130 is configured to engage the second object 40 (e.g., a recess 42 thereof) to connect the base 100 and/or the cable retainer 10 and the second object 40. The fastener 130 includes one or more engagement projections 132 that engage the second object 40 to connect the cable retainer 10 and/or the base 100 to the second object 40. The engagement projections 132 have a generally hollow, conical shape and are outwardly angled, sloped, and/or curved toward the platform 110 (e.g., the engagement projections 132 each have a wider end that opens toward the platform 110). The engagement projections 132 are disposed spaced apart from one another along the length of the fastener 130 (e.g., generally in the Z-direction). In other embodiments, the engagement projections 132 contact one another and/or are structured in a stepped and/or sawtooth-like manner.

As generally illustrated in FIGS. 1-6, the base 100 includes the first wall 150 and the second wall 160. The walls 150, 160 are disposable through a portion of the flat cable 20 (e.g., a respective recess 22, 24), which connects the base 100 and the flat cable 20 together in at least some embodiments. The walls 150, 160 are configured as an extension, protrusion, projection, flange, or other suitable body or structure that extends from the platform 110 and/or the flange 120. While the walls 150, 160 are each structured as a generally planar body in the figures, one or more of the walls 150, 160 may have other suitable configurations in other embodiments. The first wall 150 is disposed at or about a first end of the platform 110 and the second wall 160 is disposed at or about a second, opposite end of the platform 110.

As generally illustrated in FIGS. 1-3, 6, and 7C, the base 100 includes and/or defines at least one wall opening (e.g., a first wall opening 152 and a second wall opening 162) that receive a portion of the connector 50 (e.g., a tie strap). The base 100 engages the connector 50 via the wall openings 152, 162 to, for example, connect the cable retainer 10, the base 100, the retention member 200, the flat cable 20, and/or the second object 40 to the first object 30. The wall openings 152, 162 are disposed on opposite sides of the platform 110 and/or the channel 14. The wall openings 152, 162 are disposed in and defined by the walls 150, 160 of the base 100, respectively. The wall openings 152, 162 extend completely through the respective wall 150, 160 of the base 100 generally in the Y-direction. The wall openings 152, 162 are at least partially aligned with one another in the Y-direction and form and/or define a common passage 12 of the cable retainer 10. The wall openings 152, 162 are generally rectangular, but have other shapes and sizes in other embodiments.

As generally illustrated in FIGS. 1-3 and 6, the base 100 includes a latching nose 170 that engages the retention member 200 (e.g., the latching tab 210) to at least partially connect the retention member 200 to the base 100 (e.g., the second wall 160). The latching nose 170 is disposed at a free end of the second wall 160 and projects therefrom toward the first wall 150 (e.g., generally in an X-direction). The latching nose 170 has a guide surface 174 and an engagement surface 172. The engagement surface 172 generally faces toward the platform 110 and/or the support surface 112. The engagement surface 172 may contact and/or abut the latching tab 210 (e.g., the engagement surface 212 thereof) when cable retainer 10 is in the closed position. The guide surface 174 generally faces away from the platform 110 and is sloped inwardly toward the channel 14 and/or the first wall 150. The guide surface 174 of the latching nose 170 facilitates and guides insertion of at least a portion of the second wall 160 (e.g., the latching nose 170) into the recess 202 of the retention member 200 and/or into engagement with the latching tab 210, such as by contacting, abutting, and/or sliding along the guide surface 212 of the latching tab 210. When in the closed position, (i) at least a portion of the second wall 160 and/or the latching nose 170 is disposed in the recess 202 of the retention member 200, (ii) the latching nose 170 may be engaged with the latching tab 210, and (iii) the engagement surface 172 of the latching nose 170 may be and/or may come into contact with the engagement surface 212 of the latching tab 210, which may restrict and/or prevent the second wall 160 and the retention member 200 from disconnecting (e.g., to restrict and/or prevent the cable retainer 10 from adjusting from the closed position to the open position).

Figure 7A:
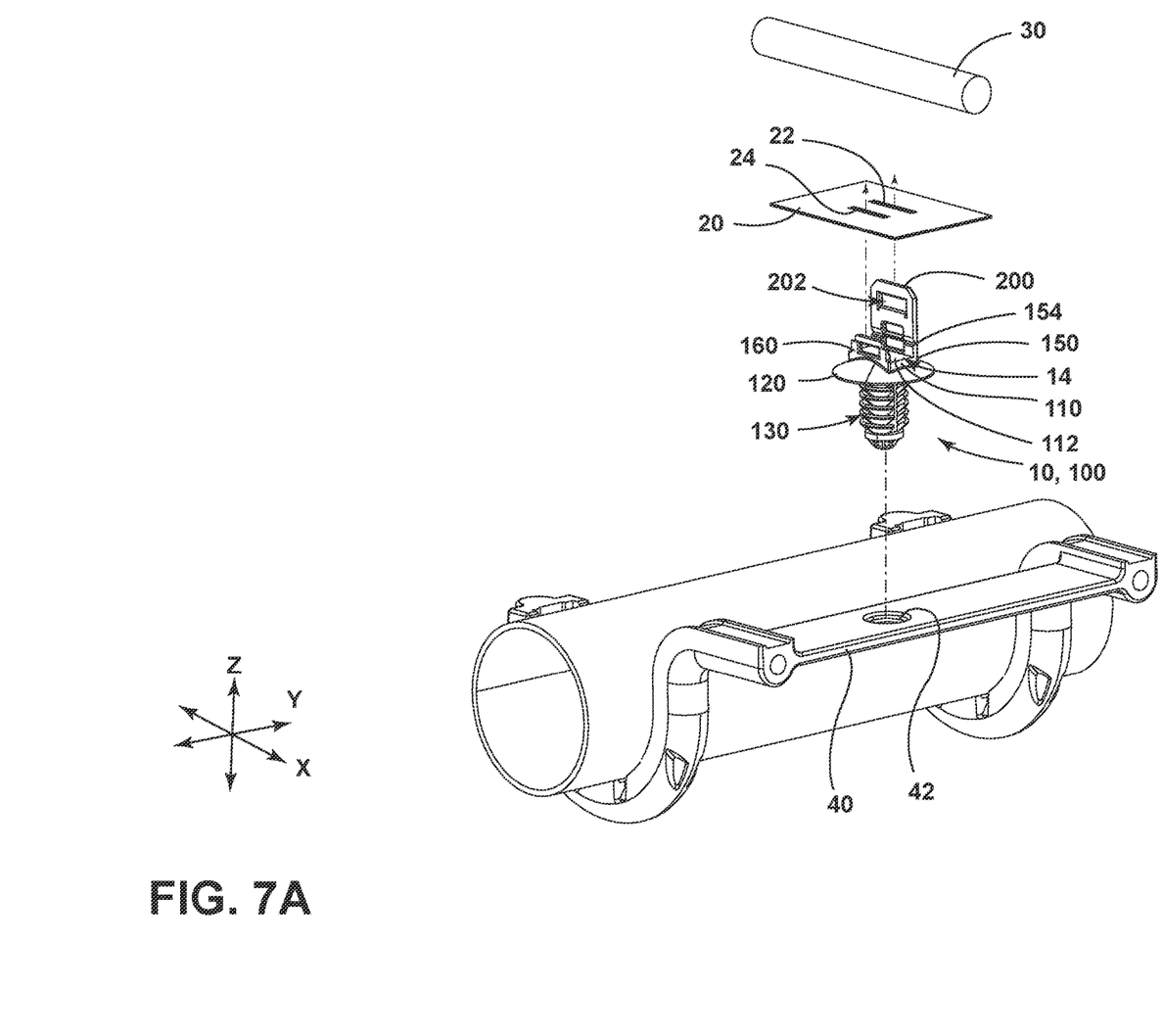
FIGS. 7A through 7E are perspective views generally illustrating an embodiment of a method of connecting a flat cable, a first object, and a second object with a cable retainer according to teachings of the present disclosure.
Figure 7B:
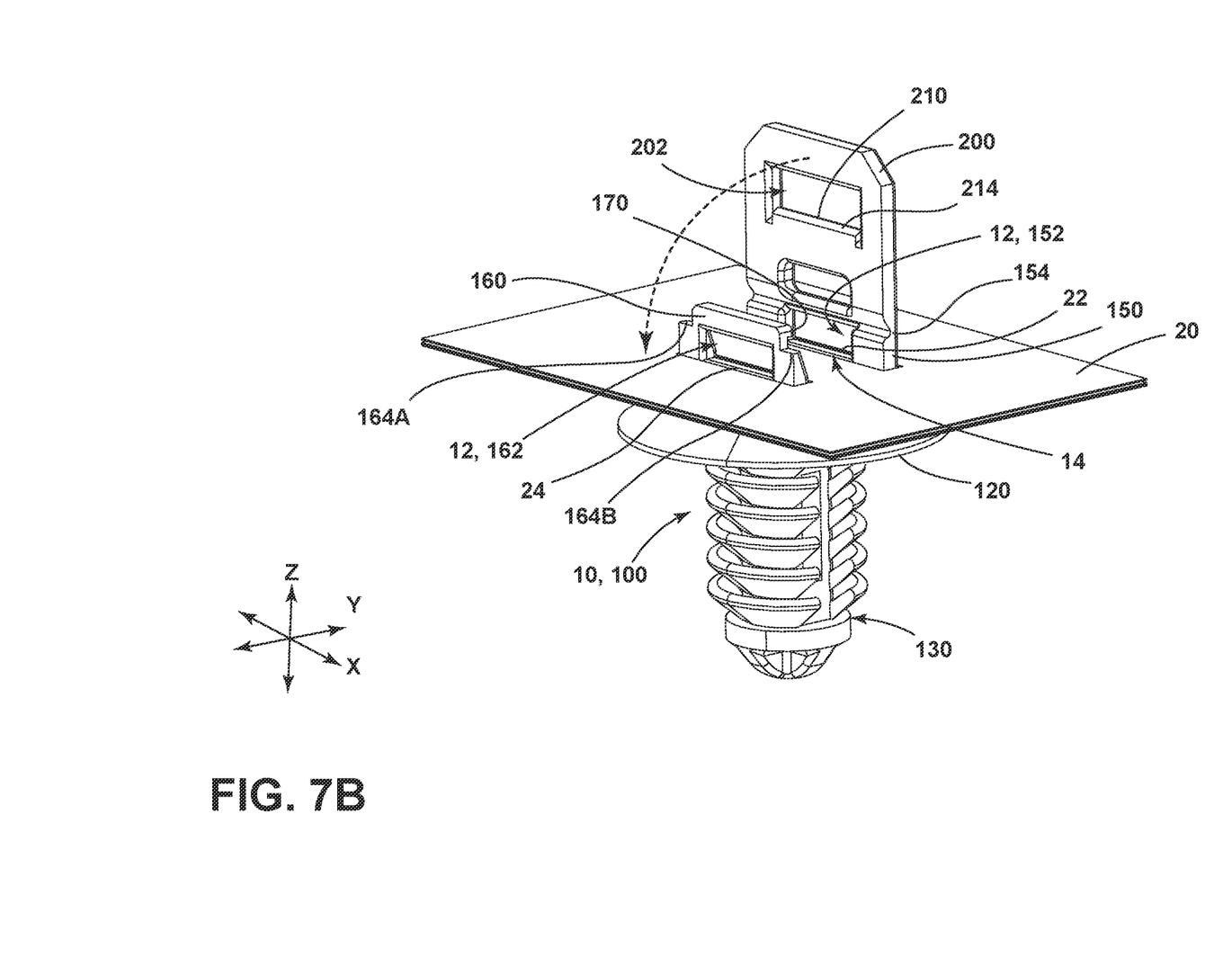

As generally illustrated in FIGS. 1, 2, and 7B, the base 100 includes a first shoulder 164A and a second shoulder 164B that engage (e.g., contact, abut) the retention member 200 to at least partially support the retention member 200 and/or the first object 30. The shoulders 164A, 164B are portions of and/or defined by the second wall 160. The shoulders 164A, 164B are disposed at the free end of the second wall 160 on opposite sides of the latching nose 170 and extend away from one another (e.g., generally in the X-direction). When in the assembled configuration, at least a portion of the second wall 160 (e.g., the latching nose 170) is disposed in the recess 202, and/or the latching nose 170 is engaged with the latching tab 210, the retention member 200 may contact and/or rest on the shoulders 164A, 164B and may be supported thereby. In this manner, the shoulders 164A, 164B may limit and/or restrict movement (e.g., further rotation) of the retention member 200 in a direction of the base 100, platform 110, and/or flange 120, which may in turn help maintain the size and shape of the channel 14.

As generally illustrated in FIGS. 1-6, the retention member 200 is configured to selectively open and/or close at least a portion of the channel 14 (e.g., an openable/closable end of the channel 14 disposed opposite the platform 110). The retention member 200 is adjustably (e.g., rotatably, pivotably) connected to the first wall 150 of the base 100 and is releasably connectable to the second wall 160 of the base 100. The retention member 200 is adjustable (e.g., rotatable, pivotable) relative to the base 100, the platform 110, the first wall 150, and/or the second wall 160 to an open position and to a closed position. When the retention member 200 is in an open position, the retention member 200 is disposed spaced apart from and disconnected from the first wall 150, the retention member 200 does not at least partially close the channel 14 (e.g., the openable/closable end of the channel 14 is at least partially open), and at least a portion of the flat cable 20 is insertable into and/or removable from the channel 14 (e.g., via the openable/closable end). Thus, the cable retainer 10 and the flat cable 20 are connectable and/or disconnectable from one another when the retention member 200 is in an open position. When the retention member 200 is in a closed position, the retention member 200 is connected to the first wall 150, the retention member 200 at least partially closes the channel 14 (e.g., the openable/closable end thereof), and the retention member 200 blocks and/or prevents at least a portion of the flat cable 20 from being inserted into the channel 14 and/or being removed from the channel 14 (e.g., via the openable/closable end). As such, the cable retainer 10 and the flat cable 20 may be attached, connected, secured, and/or locked to one another when the retention member 200 is in a closed position.

As generally illustrated in FIGS. 1-3 and 5-7C, the retention member 200 is structured as a generally planar body, but may have other suitable configurations in other embodiments. An end of the retention member 200 is adjustably (e.g., rotatably, pivotably) connected to an end of the first wall 150 opposite the platform 110 via a coupling. In the illustrative example described herein, the coupling is a living hinge 154. The retention member 200, the first wall 150, and the living hinge 154 are integrally connected and/or formed as a single, unitary, monolithic component. The living hinge 154 is an elastically deformable and/or flexible region or portion of material that is generally thinner (e.g., in the Y-direction) than the retention member 200 and the first wall 150, which facilitates adjusting and/or pivoting the retention member 200 relative to the base 100, the platform 110, the first wall 150, and/or the second wall 160 (e.g., when adjusting the retention member 200 to an open position and/or to a closed position). In other embodiments, the retention member 200 and the first wall 150 may be separate, independent components/elements from one another and/or may or may not be connected (e.g., adjustably and/or releasably) to one another via one or more suitable couplings, connectors, and/or fasteners (e.g., via an independent hinge connector, a flexible strap, a tether).

As generally illustrated in FIGS. 1-3 and 6-7C, the retention member 200 includes and/or defines a recess 202 that receives at least a portion of the base 100 (e.g., at least a portion of the second wall 160 and/or the latching nose 170). The recess 202 is disposed in the retention member 200 at or about a free end of the retention member 200 located opposite the first wall 150. The recess 202 extends completely through the retention member 200 (e.g., generally in a Z-direction and/or perpendicularly to the support surface 112 when the retention member 200 is in the closed position). The recess 202 is generally rectangular, but has other shapes and/or sizes in other embodiments.

Figure 6:
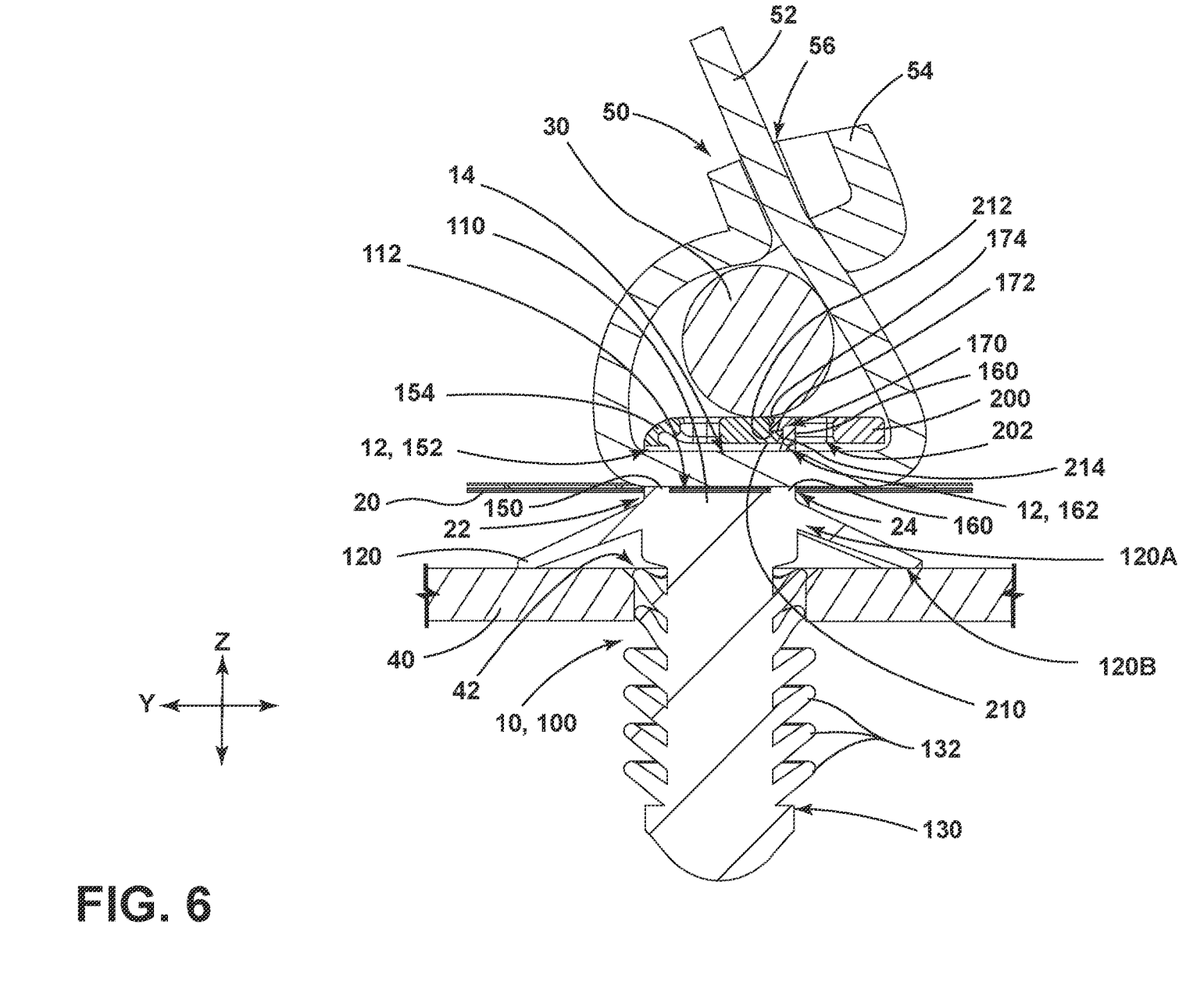
FIG. 6 is a cross-sectional view generally illustrating an embodiment of a cable retainer connected to a flat cable, a first object, and a second object according to teachings of the present disclosure.

As generally illustrated in FIGS. 1, 2, and 6, the retention member 200 includes a latching tab 210 that releasably engages the base 100 (e.g., via the latching nose 170) to at least partially connect the retention member 200 to the base 100 (e.g., the second wall 160). The latching tab 210 and the latching nose 170 are complimentary to one another. The latching tab 210 is disposed at least partially within the recess 202. The latching tab 210 extends and/or projects from the retention member 200 into the recess 202 in a direction toward the free end of the retention member 200. The latching tab 210 is recessed in the retention member 200 and/or the recess 202 such that an engagement surface 212 of the latching tab 210 is offset from an outer surface of the retention member 200 (e.g., generally in the Z-direction and/or toward the platform 110 when the retention member 200 is in the closed position).

The latching tab 210 has an engagement surface 212 and a guide surface 214. The engagement surface 212 may engage, contact, and/or abut the latching nose 170 (e.g., the engagement surface 172 thereof) when the retention member 200 is in the closed position, which restricts and/or prevents the retention member 200 and the second wall 160 from disengaging and/or disconnecting (e.g., restricts and/or prevents the retention member 200 from adjusting and/or moving out of the closed position, such as to and/or toward the open position). The guide surface 214 facilitates insertion of at least a portion of the second wall 160 (e.g., the latching nose 170) into the recess 202 of the retention member 200, engagement of the latching tab 210 and the latching nose 170, and/or elastic deformation (e.g., flexing and/or bending) of the first wall 150 and/or the second wall 160 away from one another, such as by contacting, abutting, and/or sliding on the guide surface 174 of the latching nose 170.

As generally illustrated in FIGS. 3-6 and 7C-7E, when in the closed position, the retention member 200 is disposed on and connected to the first wall 150 and the second wall 160 of the base 100. The retention member 200 extends (e.g., generally in the Y-direction) between the first wall 150 and the second wall 160 of the base 100 and at least partially closes the channel 14 (e.g., the openable/closable end thereof). The free end of the retention member 200 extends beyond the second wall 160, which provides a user with an easily accessible and engageable region of the retention member 200 that may be utilized (e.g., pressed and/or pushed) to actuate and/or adjust a position of the retention member 200 (e.g., to disconnect the retention member 200 from the second wall 160). The living hinge 210 is at least partially deformed such that the retention member 200 extends transversely (e.g., obliquely or perpendicularly) to the walls 150, 160. The retention member 200 contacts, abuts, and/or rests on the shoulders 164A, 164B and is thereby supported by the shoulders 164A, 164B and/or the second wall 160. At least a portion of the second wall 160 (e.g., the latching nose 170) projects into and is at least partially disposed in the recess 202 of the retention member 200. The latching tab 210 is engaged with the latching nose 170, thereby releasably connecting the retention member 200 to the second wall 160 of the base 100 and restricting and/or preventing the retention member 200 from adjusting and/or moving out of the closed position, such as to and/or toward the open position. The guide surface 214 of the latching tab 210 generally faces toward the platform 110, slopes back toward the first wall 150 and/or the wall opening 152, and/or extends substantially parallel to the guide surface 174 of the latching nose 170. The engagement surface 212 of the latching tab 210 faces generally (i) away from the platform 110 and/or the support surface 112 and (ii) toward the latching nose 170 and/or the engagement surface 172 thereof (e.g., generally in the Z-direction). The engagement surface 212 of the latching tab 210 contacts and/or is biased against the engagement surface 172 of the latching nose 170 via the living hinge 256 (e.g., due to its tendency to resist deformation and to return to an equilibrium state, which may coincide with an open position of the retention member 200). Biasing the latching tab 210 against the latching nose 170 limits and/or restricts relative movement between the base 100 and the retention member 200, which may reduce and/or prevent noise generation (e.g., rattling) for example.

As generally illustrated in FIGS. 4-7E, the flat cable 20 is flexible and includes one or more electrical conductors overmolded and/or embedded within an insulating material that electrically insulates the conductors from each other and/or from other components. The conductors may be disposed substantially parallel with each other and/or may be substantially aligned with a common plane (e.g., an X-Y plane). The flat cable 20 also includes a plurality of recesses (e.g., a first recess 22 and a second recess 24) configured to receive a respective wall 150, 160 of the base 100. Here, the first recess 22 is configured to receive the first wall 150 and the second recess 24 is configured to receive the second wall 160. The recesses 22, 24 are each disposed in and/or defined by the insulating material, such as between adjacent conductors. The recesses 22, 24 each have a generally rectangular shape, but may alternatively have a circular, polygonal, or oblong shape, among others. The recesses 22, 24 have a length and a width generally corresponding to a length and a width of the corresponding wall 150, 160 of the base 100, respectively. For example, the length of the first recess 22 (e.g., extending generally in the X-direction) may be substantially equal to or slightly smaller than the length of the first wall 150 (e.g., at or about the platform 110). Similarly, the width of the first recess 22 (e.g., extending generally in the Y-direction) may be substantially equal to or slightly smaller than the width of the first wall 150 (e.g., at or about the platform 110). In some configurations, the corresponding lengths and widths of the recesses 22, 24 and the walls 150, 160 provide an interference fit between the flat cable 20 and walls 150, 160 enabling the base 100 and the flat cable 20 to be connected without closing the retention member 200 (e.g., when the cable retainer 10 is in the open position).

The flat cable 20 may be connected to the cable retainer 10 when the retention member 200 is in the open position and/or when the retention member 200 is in the closed position. When the retention member 200 is in an open position, the cable retainer 10 and the flat cable 20 may be connected via the interference fit of the walls 150, 160 in the recesses 22, 24 of the flat cable 20 (see, e.g., FIG. 7B). When the retention member 200 is in a closed position as generally illustrated in FIGS. 4-6 and 7C-7E, at least a portion of the flat cable 20 (e.g., a portion disposed and/or defined between the recesses 22, 24 in the Y-direction) may be disposed in the channel 14 and retained therein via the platform 110, the walls 150, 160, and the retention member 200. The first wall 150 is disposed partially in the first recess 22 of the flat cable 20. The second wall 160 is disposed partially in the second recess 24 of the flat cable 20 and partially in the recess 202 of the retention member 200. The flat cable 20 may contact, may be disposed on, and/or may be supported by the retention member 200 and/or the base 100 (e.g., the support surface 112, the platform 110, and/or the flange 120) when connected to the cable retainer 10.

As generally illustrated in FIGS. 4-7A and 7C-7E, the first object 30 is a wire and/or wire bundle of one or more vehicle subsystems, such as an airbag system and/or an infotainment system. While the first object 30 is round (e.g., a round wire and/or a round wire bundle) in FIGS. 4-7A and 7C-7E, the first object 30 may have other suitable shapes (e.g., generally rectangular and/or polygonal) in other embodiments. In other embodiments, the first object 30 may be and/or include other components such as a tube, a pipe, a bar, a beam, and other similar components for example. The first object 30 is connectable to the cable retainer 10 via one or more connectors 50. The connector 50 is configured as a tie strap (e.g., a zip-tic) including a tail 52 and a head 54. The head 54 is disposed at and connected to a first longitudinal end of the tail 52. A free end of the tail 52 (e.g., a second longitudinal end of the tail 52 opposite the first longitudinal end and/or the head 54) is insertable into a through hole 56 of the head 54. The tail 52 includes teeth, serrations, and/or other similar formations that engage a claw of the head 54 to connect the tail 52 to the head 54 and restrict and/or prevent removal of the tail 52 from the through hole 56 of the head 54. Alternatively, the connector 50 may be another suitable type of connector 50 (e.g., a twist-tic, string, clip, fastener). For example, in another embodiment, the connector 50 is structured as a fastener (e.g., a Christmas tree fastener, detent pin, snap lock pin, push-in rivet) that engages the common passage 12 of the cable retainer 10 and a mounting tab of the first object 30 to secure the mounting tab between the base 100 (e.g., the first wall 150 and/or the second wall 160) and a portion of the fastener.

As generally illustrated in FIGS. 4-6, 7D, and 7E, when the retention member 200 is in a closed position and the cable retainer 10 is connected to the first object 30, the connector 50 is engaged with the cable retainer 10 and with the first object 30 thereby connecting the cable retainer 10 and the first object 30 to one another. The first object 30 is disposed on and/or adjacent to the retention member 200 outside of the channel 14. In examples, the first object 30 is disposed at or about and may substantially cover the recess 202, the latching tab 210, and/or the latching nose 170. The connector 50 is wrapped at least partially around the first object 30. The connector 50 also extends through and is at least partially disposed in the common passage 12 of the cable retainer 10 (e.g., the wall openings 152, 162 and the channel 14). The tail 52 of the connector 50 (e.g., at or about the free end) is connected to the head 54 of the connector 50 via the teeth and the claw such that the connector 50 forms a loop around the first object 30 and a portion of the cable retainer 10 (e.g., a portion of the base 100, the first wall 150, and/or the second wall 160). Conceivably, the first object 30 may also be connected to the cable retainer 10 when the retention member 200 is in an open position, which may include the connector 50 also extending through a recess and/or opening (e.g., recess 202) of the retention member 200.

The second object 40 may be and/or include a surface, a portion, and/or a component of a vehicle, such as vehicle floor, a vehicle ceiling, and/or a vehicle panel, and/or may include a non-vehicle component, among others. As generally illustrated in FIGS. 4-6, 7A, 7D, and 7E, the second object 40 is configured as a bracket or mount. The second object 40 includes one or more recesses 42 and/or depressions for receiving the fastener 130 of the cable retainer 10. The recess 42 has a generally circular shape, but may alternatively have an oval, polygonal, or oblong shape, among others.

The second object 40 may be connected to the cable retainer 10 when the retention member 200 is in an open position and/or in a closed position. As generally illustrated in FIGS. 4-6 and 7E, when the cable retainer 10 is connected to the second object 40, the fastener 130 of the base 100 is disposed in the recess 42 of the second object 40. One or more of the engagement projections 132 of the fastener 130 engage the second object 40 (e.g., contact a surface of the second object 40 facing away from the flange 120) securing and/or connecting the base 100 and/or the cable retainer 10 to the second object 40. The second, wider end 120B of the flange 120 presses against the second object 40 (e.g., a surface of the second object 40 facing the flange 120) and biases one or more of the engagement projections 132 of the fastener 130 against the second object 40. This restricts and/or limits relative movement between the base 100 and the second object 40, which may limit, reduce, and/or prevent noise generation (e.g., rattling).

A method of assembling the cable retainer 10 and/or of connecting a plurality of objects (e.g., objects 20, 30, 40) to one another with the cable retainer 10 is generally illustrated in FIGS. 7A-7E. The method includes connecting the flat cable 20 and the cable retainer 10 (see, e.g., FIGS. 7A and 7B), connecting the first object 30 and the cable retainer 10 (see, e.g., FIG. 7C), and/or connecting the second object 40 and the cable retainer 10 (see, e.g., FIG. 7D) to connect the flat cable 20, the first object 30, and the second object 40 to one another (see, e.g., FIGS. 4-6 and 7E).

As generally illustrated in FIGS. 7A and 7B, connecting the flat cable 20 and the cable retainer 10 includes disposing the walls 150, 160 of the base 100 through a portion of the flat cable 20 (e.g., a corresponding recess 22, 24) when the retainer 200 is in an open position, such as by inserting the first wall 150 into the first recess 22 of the flat cable 20 and the second wall 160 into the second recess 24 of the flat cable 20 (see, e.g., FIG. 7A). Disposing the walls 150, 160 through a portion of the flat cable 20 may include passing the retainer 200 completely through the first recess 22, disposing at least a portion of the flat cable 20 in the channel 14, and/or disposing the flat cable 20 on the support surface 112 of the platform 110. In addition, disposing the walls 150, 160 through a portion of the flat cable 20 may include connecting the base 100 and the flat cable 20 to one another via establishing an interference fit of the walls 150, 160 in the recesses 22, 24.

After inserting the walls 150, 160 into the recesses 22, 24, the retention member 200 is adjusted from an open position (see, e.g., FIG. 7B) to a closed position (see, e.g., FIG. 7C) to attach, connect, and/or secure the flat cable 20 and the cable retainer 10 to one another. Adjusting the retention member 200 from an open position to a closed position includes adjusting and/or pivoting the retention member 200 about the living hinge 154 (e.g., toward the second wall 160 and/or the platform 110) relative to the base 100, the first wall 150, the second wall 160, and/or the platform 110 to connect the retention member 200 and the second wall 160 to one another and to at least partially close the channel 14 (e.g., the openable/closable end thereof) with the retention member 200 such that removal of the flat cable 20 from the channel 14 (e.g., generally in a Z-direction) is restricted and/or prevented by the base 100 and the retention member 200. Adjusting and/or pivoting the retention member 200 about the living hinge 154 includes bending, flexing, and/or deforming (e.g., elastically) the living hinge 154. Adjusting and/or pivoting the retention member 200 about the living hinge 154 includes disposing and/or inserting at least a portion of the second wall 160 (e.g., at least a portion of the latching nose 170) into the recess 202 of the retention member 200 to engage the latching nose 170 of the second wall 160 and the latching tab 210 of the retention member 200, which in turn connects the retention member 200 and the second wall 160. Engaging the latching nose 170 and the latching tab 210 includes contacting and/or abutting the guide surfaces 174, 214 of the latching nose 170 and the latching tab 210, and adjusting, moving, and/or sliding the guide surfaces 174, 214 on one another to guide the latching nose 170 and the latching tab 210 into engagement. Adjusting, moving, and/or sliding the guide surfaces 174, 214 on one another, in turn, causes the first wall 150 and/or the second wall 160 to bend, flex, and/or deform (e.g., elastically) away from one another (e.g., generally in the Y-direction) enabling the latching nose 170 and the latching tab 210 to move past one another (e.g., generally in the Z-direction) and their engagement surfaces 172, 212 to engage, contact, and/or abut one another by adjusting the retention member 200 about the hinge 154. Adjusting and/or pivoting the retention member 200 about the living hinge 154 also includes disposing the retention member 200 on the shoulders 164A, 164B of the second wall 160 to support the retention member 200.

Figure 7C:
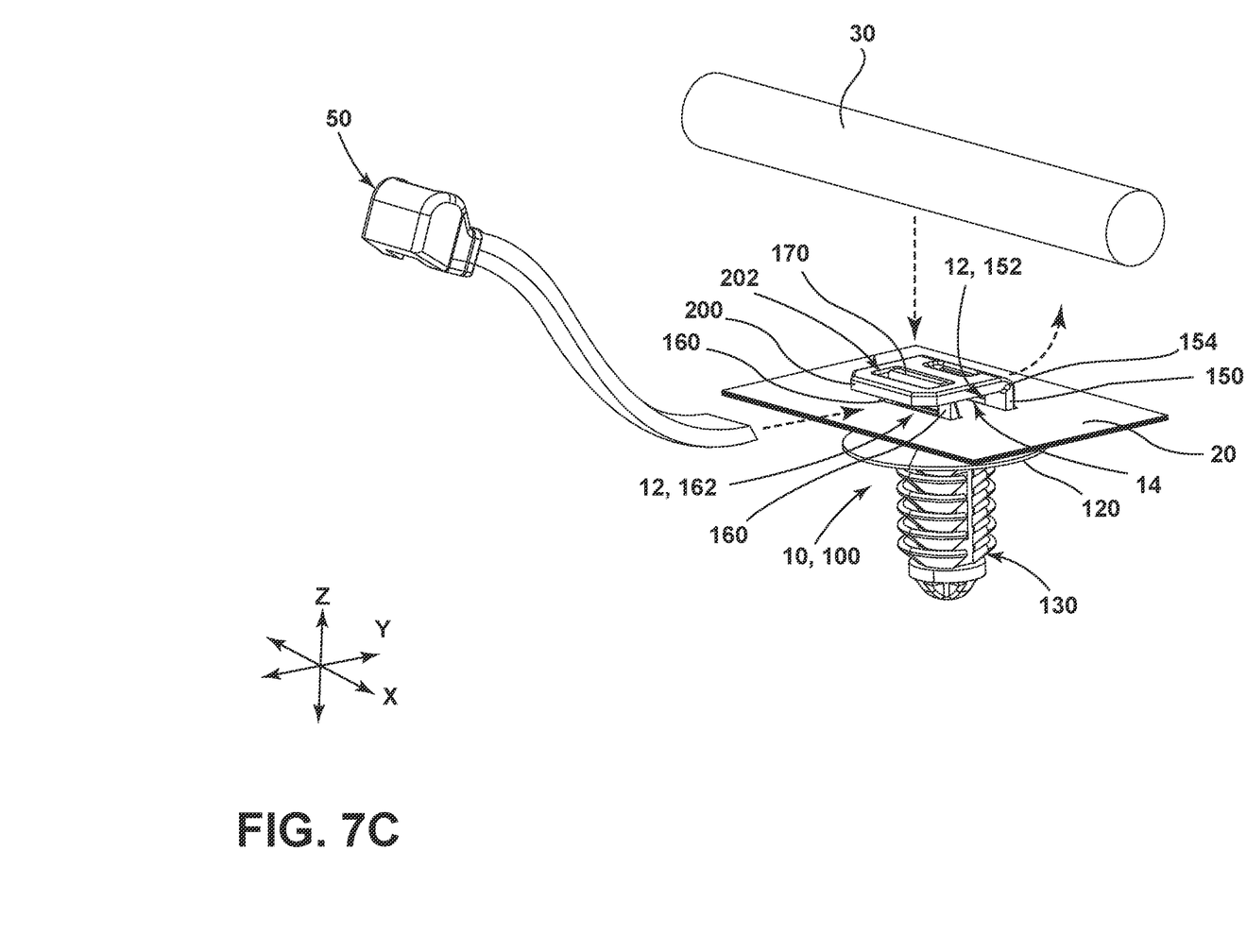
Figure 7D:
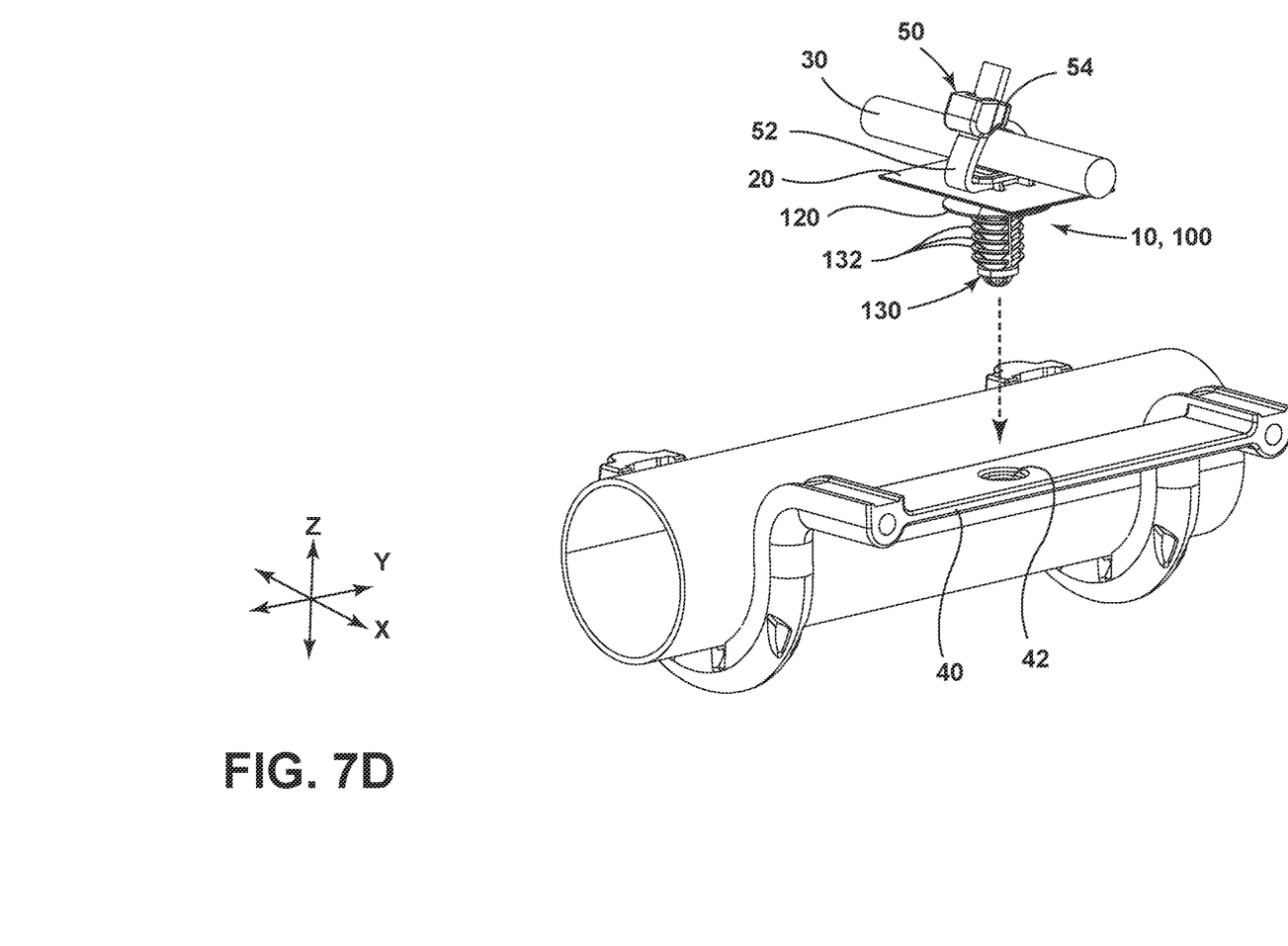
Figure 7E:
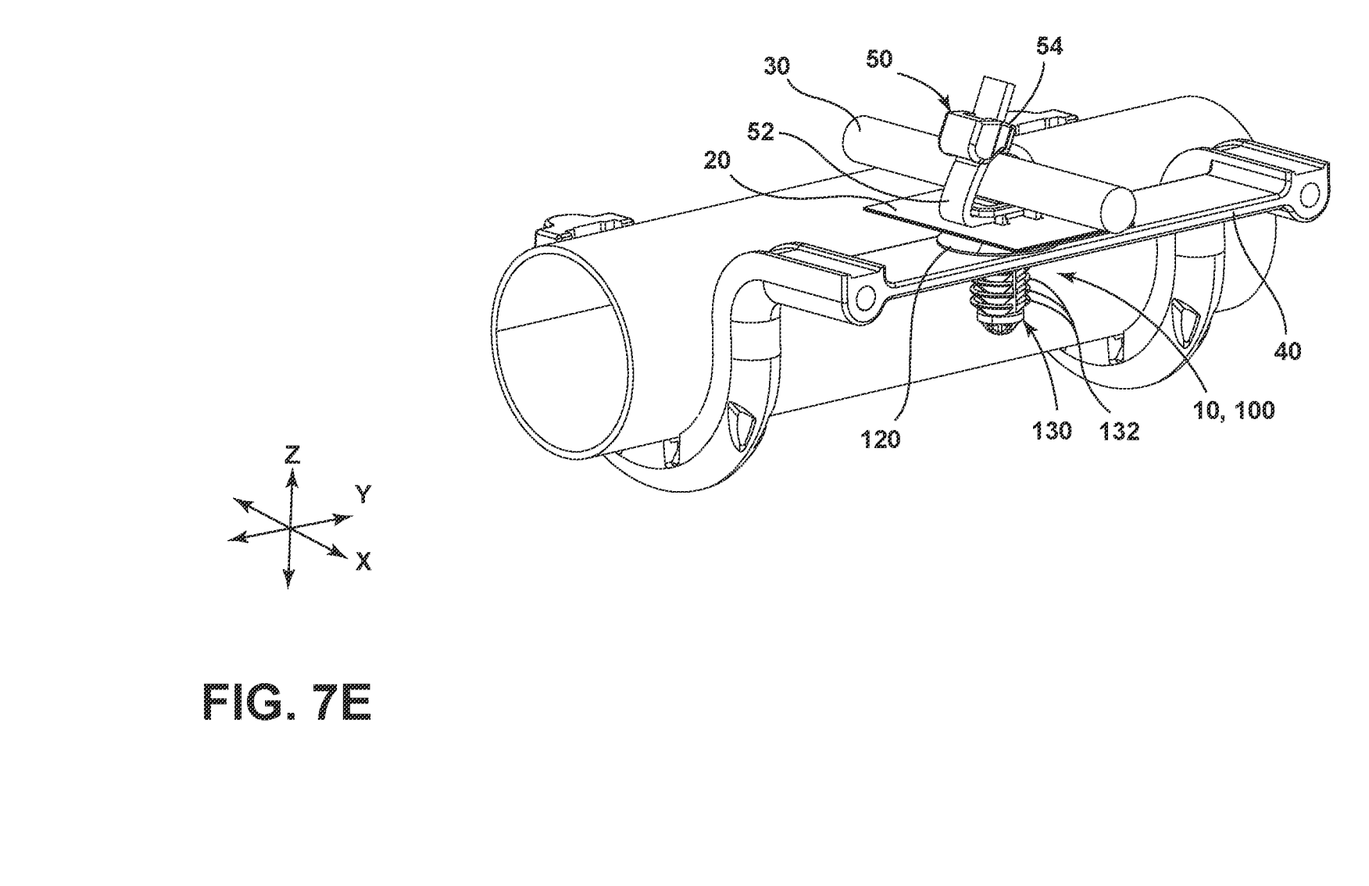

As generally illustrated in FIG. 7C, connecting the first object 30 and the cable retainer 10 includes positioning the first object 30 relative to the cable retainer 10 and/or disposing the first object 30 on the retention member 20. Connecting the first object 30 and the cable retainer 10 includes (e.g., after positioning the first object 30 relative to and/or on the retention member 200) engaging the connector 50 with the first object 30 and with the cable retainer 10. This, in turn, includes passing the tail 52 of the connector 50 (e.g., the free end of the tail 52) through the first wall 150 (e.g., via the wall opening 152) and the second wall 160 (e.g., via the wall opening 162) such that the tail 52 of the connector 50 is disposed partially within and extends through the common passage 12, wrapping the connector 50 around at least a portion of the first object 30, and connecting the tail 52 of the connector 50 to the head 54 of the connector 50 (e.g., via inserting the free end of the tail 52 into the through hole 56 and engaging the teeth of the tail 52 with the claw of the head 54) such that the connector 50 forms a loop around at least a portion of the first object 30 and a portion of the cable retainer 10 (e.g., a portion of the first wall 150, the second wall 160, and/or the retention member 200) as generally shown in FIG. 7D. Subsequently, relative movement (e.g., play) between the first object 30 and the cable retainer 10 may be reduced, restricted, limited, and/or eliminated (e.g., via manipulating the connector 50, the first object 30, and/or the cable retainer 10 to tighten the looped connector 50 around the first object 30 and the cable retainer 10) to, for example, limit and/or prevent noise generation. Generally, the first object 30 and the cable retainer 10 are connected after the flat cable 20 and the cable retainer 10 have been connected (e.g., after the flat cable 20 is disposed in the channel 14 and the retention member 200 is in the closed position) to, for example, connect the first object 30 and the flat cable 20 together.

As generally illustrated in FIG. 7D, connecting the second object 40 and the cable retainer 10 includes engaging the fastener 130 of the cable retainer 10 with the second object 40. This includes adjusting, moving, and/or pressing the fastener 130 into the recess 42 of the second object 40 (e.g., from the position shown in FIG. 7D to the position shown in FIG. 7E) such that one or more engagement projections 132 of the fastener 130 engage the second object 40 (e.g., contact a surface of the second object 40 facing away from the flange 120), which connects the base 100, the cable retainer 10, and/or one or more components connected thereto (e.g., the flat cable 20 and/or the first object 30) to the second object 40. Connecting the second object 40 and the cable retainer 10 may also include biasing one or more of the engagement projections 132 against the second object 40 via the flange 120 pressing against the second object 40 (e.g., a surface of the second object 40 facing the flange 120). Generally, the second object 40 and the cable retainer 10 are connected after the cable retainer 10, the flat cable 20, and the first object 30 have been connected to one another to, for example, connect the flat cable 20 and the first object 30 to the second object 40. However, the second object 40 and the base 100 and/or the cable retainer 10 may be connected to one another before connecting the flat cable 20 and the cable retainer 10 and/or before connecting the first object 30 and the cable retainer 10.

The disclosure includes, without limitation, the following embodiments:

1. A cable retainer for connecting a flat cable, a first object, and/or a second object to one another, the cable retainer comprising: a base including: a platform; a fastener extending from the platform, the fastener engageable with said second object; a plurality of walls extending from the platform, the plurality of walls disposable through a portion of said flat cable; and a plurality of wall openings disposed in the plurality of walls, the plurality of wall openings aligned with one another and at least partially defining a common passage in which a connector is received to connect said first object to the base; a retention member adjustably connected to a first wall of the plurality of walls, the retention member adjustable to an open position and to a closed position; and a channel defined at least partially by the base; wherein, when the retention member is disposed in the closed position, the retention member is disposed on and releasably connected to a second wall of the plurality of walls and at least partially closes an end of the channel; and wherein, when the retention member is disposed in the open position, the retention member is disposed spaced apart from the second wall and the end of the channel is at least partially open such that at least a portion of said flat cable is insertable into the channel through the end of the channel.

2. The cable retainer of embodiment 1, wherein: said first object is at least one of a wire and a wire bundle; said second object is at least one of a bracket and a panel; and said connector is a tie strap.

3. The cable retainer according to any of the preceding embodiments, wherein the retention member is adjustably connected to the first wall of the base via a living hinge.

4. The cable retainer according to any of the preceding embodiments, wherein: the retention member includes a latching tab; the second wall includes a latching nose complimentary to the latching tab of the retention member; and when the retention member is disposed in the closed position, the latching tab and the latching nose are engaged with one another releasably connecting the retention member and the second wall.

5. The cable retainer according to any of the preceding embodiments, wherein: the retention member includes a recess; the latching tab projects into the recess; and at least a portion of the latching nose is disposed within recess when the retention member is disposed in the closed position.

6. The cable retainer according to any of the preceding embodiments, wherein: the latching tab includes an engagement surface and a guide surface; and the latching tab is recessed in the retention member such that the engagement surface is offset from an outer surface of the retention member.

7. The cable retainer according to any of the preceding embodiments, wherein: the second wall includes at least one shoulder; and the retention member is disposed on and supported by the at least one shoulder when the retention member is disposed in the closed position.

8. A method of connecting a plurality of objects to one another with the cable retainer according to any of the preceding embodiments, comprising: connecting the flat cable and the cable retainer via inserting the plurality of walls of the base through a portion of the flat cable and subsequently connecting the retention member and the second wall of the base to one another via adjusting the retention member from the open position to the closed position; connecting the first object and the cable retainer via engaging the connector with the first object and with the cable retainer; and connecting the second object and the cable retainer via engaging the fastener of the cable retainer with the second object.

9. The method according to any of the preceding embodiments, wherein connecting the flat cable and the cable retainer includes at least one of restricting and preventing removal of at least a portion of the flat cable from the channel via at least partially closing the end of the channel with the retention member.

10. The method according to any of the preceding embodiments, wherein: the retention member is adjustably connected to the first wall of the base via a living hinge; and adjusting the retention member from the open position to the closed position includes pivoting the retention member about the living hinge and deforming the living hinge.

11. The method according to any of the preceding embodiments, wherein adjusting the retention member from the open position to the closed position includes engaging a latching tab of the retention member and a latching nose of the second wall.

12. The method according to any of the preceding embodiments, wherein engaging the latching tab and the latching nose includes elastically deforming at least one of the first wall and the second wall via sliding a guide surface of the latching tab and a guide surface of the latching nose on one another.

13. The method according to any of the preceding embodiments, wherein adjusting the retention member from the open position to the closed position includes: inserting at least a portion of the second wall into a recess of the retention member; and disposing the retention member on at least one shoulder of the second wall.

14. The method according to any of the preceding embodiments, wherein inserting at least a portion of the second wall into the recess of the retention member includes: inserting a latching nose of the second wall into the recess of the retention member; and engaging the latching nose with a latching tab of the retention member that is disposed in the recess.

15. The method according to any of the preceding embodiments, wherein inserting the plurality of walls of the base through the portion of the flat cable includes: passing the retainer through a first recess of the flat cable; inserting the first wall of the base into the first recess of the flat cable; inserting the second wall of the base into a second recess of the flat cable; and disposing at least a portion of the flat cable in the channel.

16. The method according to any of the preceding embodiments, wherein engaging the fastener of the cable retainer with the second object includes adjusting the fastener into a recess of the second object.

17. The method according to any of the preceding embodiments, wherein the second object is at least one of a bracket and a panel.

18. The method according to any of the preceding embodiments, wherein: the connector is a tie strap; and engaging the connector with the first object and with the cable retainer includes passing a tail of the tie strap through the common passage of the cable retainer, wrapping the tie strap around the first object, and connecting the tail of the tie strap to a head of the tie strap.

19. The method according to any of the preceding embodiments, wherein the first object is at least one of a wire and a wire bundle.

20. The method according to any of the preceding embodiments, wherein: engaging the fastener of the cable retainer with the second object includes pressing the fastener into a recess of the second object; and the second object is at least one of a bracket and a panel.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first element could be termed a second element, and similarly, a second element could be termed a first element, without departing from the scope of the various described embodiments. The first element and the second element are both elements, but they are not the same element.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including." "comprises." and/or "comprising," when used in this specification, specify the presence of stated features, integers, steps, operations, elements, and/or components, but do not preclude the presence or addition of one or more other features, integers, steps, operations, elements, components, and/or groups thereof.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

All matter contained in the above description or shown in the accompanying drawings shall be interpreted as illustrative only and not limiting. Changes in detail or structure may be made without departing from the present disclosure.

What is claimed is:

1. A cable retainer for connecting a flat cable, a first object, and/or a second object to one another, the cable retainer comprising:
    a base including:
      a platform;
      a fastener extending from the platform, the fastener engageable with said second object;
      a plurality of walls extending from the platform, the plurality of walls disposable through a portion of said flat cable; and
      a plurality of wall openings disposed in the plurality of walls, the plurality of wall openings aligned with one another and at least partially defining a common passage in which a connector is received to connect said first object to the base;
a retention member adjustably connected to a first wall of the plurality of walls, the retention member adjustable to an open position and to a closed position; and
a channel defined at least partially by the base;
wherein, when the retention member is disposed in the closed position, the retention member is disposed on and releasably connected to a second wall of the plurality of walls and at least partially closes an end of the channel; and
wherein, when the retention member is disposed in the open position, the retention member is disposed spaced apart from the second wall and the end of the channel is at least partially open such that at least a portion of said flat cable is insertable into the channel through the end of the channel.

2. The cable retainer of claim 1, wherein:
said first object is at least one of a wire and a wire bundle;
said second object is at least one of a bracket and a panel; and
said connector is a tie strap.

3. The cable retainer of claim 1, wherein the retention member is adjustably connected to the first wall of the base via a living hinge.

4. The cable retainer of claim 1, wherein:
the retention member includes a latching tab;
the second wall includes a latching nose complimentary to the latching tab of the retention member; and
when the retention member is disposed in the closed position, the latching tab and the latching nose are engaged with one another releasably connecting the retention member and the second wall.

5. The cable retainer of claim 4, wherein:
the retention member includes a recess;
the latching tab projects into the recess; and
at least a portion of the latching nose is disposed within recess when the retention member is disposed in the closed position.

6. The cable retainer of claim 4, wherein:
the latching tab includes an engagement surface and a guide surface; and
the latching tab is recessed in the retention member such that the engagement surface is offset from an outer surface of the retention member.

7. The cable retainer of claim 1, wherein:
the second wall includes at least one shoulder; and
the retention member is disposed on and supported by the at least one shoulder when the retention member is disposed in the closed position.

8. A method of connecting a plurality of objects to one another with the cable retainer of claim 1, comprising:
connecting the flat cable and the cable retainer via inserting the plurality of walls of the base through a portion of the flat cable and subsequently connecting the retention member and the second wall of the base to one another via adjusting the retention member from the open position to the closed position;
connecting the first object and the cable retainer via engaging the connector with the first object and with the cable retainer; and
connecting the second object and the cable retainer via engaging the fastener of the cable retainer with the second object.

9. The method of claim 8, wherein connecting the flat cable and the cable retainer includes at least one of restricting and preventing removal of at least a portion of the flat cable from the channel via at least partially closing the end of the channel with the retention member.

10. The method of claim 8, wherein:
the retention member is adjustably connected to the first wall of the base via a living hinge; and
adjusting the retention member from the open position to the closed position includes pivoting the retention member about the living hinge and deforming the living hinge.

11. The method of claim 8, wherein adjusting the retention member from the open position to the closed position includes engaging a latching tab of the retention member and a latching nose of the second wall.

12. The method of claim 11, wherein engaging the latching tab and the latching nose includes elastically deforming at least one of the first wall and the second wall via sliding a guide surface of the latching tab and a guide surface of the latching nose on one another.

13. The method of claim 8, wherein adjusting the retention member from the open position to the closed position includes:
inserting at least a portion of the second wall into a recess of the retention member; and
disposing the retention member on at least one shoulder of the second wall.

14. The method of claim 13, wherein inserting at least a portion of the second wall into the recess of the retention member includes:
inserting a latching nose of the second wall into the recess of the retention member; and
engaging the latching nose with a latching tab of the retention member that is disposed in the recess.

15. The method of claim 8, wherein inserting the plurality of walls of the base through the portion of the flat cable includes:
passing the cable retainer through a first recess of the flat cable;
inserting the first wall of the base into the first recess of the flat cable;
inserting the second wall of the base into a second recess of the flat cable; and
disposing at least a portion of the flat cable in the channel.

16. The method of claim 8, wherein engaging the fastener of the cable retainer with the second object includes adjusting the fastener into a recess of the second object.

17. The method of claim 16, wherein the second object is at least one of a bracket and a panel.

18. The method of claim 8, wherein:
the connector is a tie strap; and
engaging the connector with the first object and with the cable retainer includes passing a tail of the tie strap through the common passage of the cable retainer, wrapping the tie strap around the first object, and connecting the tail of the tie strap to a head of the tie strap.

19. The method of claim 18, wherein the first object is at least one of a wire and a wire bundle.

20. The method of claim 19, wherein:
engaging the fastener of the cable retainer with the second object includes pressing the fastener into a recess of the second object; and
the second object is at least one of a bracket and a panel.

* * * * *